(12) United States Patent
Fang et al.

(10) Patent No.: US 8,621,149 B2
(45) Date of Patent: Dec. 31, 2013

(54) CONTROLLING ACCESS TO A CACHE MEMORY USING PRIVILEGE LEVEL INFORMATION

(75) Inventors: Zhen Fang, Portland, OR (US); Li Zhao, Beaverton, OR (US); Ravishankar Iyer, Hillsboro, OR (US); Tong Li, Portland, OR (US); Donald K. Newell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 12/645,788

(22) Filed: Dec. 23, 2009

(65) Prior Publication Data
US 2011/0153926 A1  Jun. 23, 2011

(51) Int. Cl.
 G06F 12/00 (2006.01)
 G06F 13/00 (2006.01)
 G06F 13/28 (2006.01)
 G06F 9/26 (2006.01)
 G06F 9/34 (2006.01)

(52) U.S. Cl.
 USPC .......................... 711/118; 711/206; 711/207

(58) Field of Classification Search
 USPC .......................... 711/118, 206, 207
 See application file for complete search history.

(56) References Cited

U.S. PATENT DOCUMENTS

| 4,890,223 | A | * | 12/1989 | Cruess et al. ................. 711/207 |
| 5,577,231 | A | * | 11/1996 | Scalzi et al. ..................... 703/26 |
| 6,018,786 | A | | 1/2000 | Krick et al. |
| 6,021,461 | A | | 2/2000 | Dhong et al. |
| 6,535,959 | B1 | | 3/2003 | Ramprasad et al. |
| 6,578,138 | B1 | | 6/2003 | Kyker et al. |
| 7,457,917 | B2 | | 11/2008 | Damaraju |
| 2002/0129201 | A1 | | 9/2002 | Maiyuran et al. |
| 2005/0050278 | A1 | | 3/2005 | Meier et al. |
| 2006/0036830 | A1 | * | 2/2006 | Dinechin et al. .............. 711/200 |
| 2008/0235457 | A1 | * | 9/2008 | Hasenplaugh et al. ........ 711/130 |

OTHER PUBLICATIONS

Koopman, Phillip, "Main Memory Architecture," Oct. 1998, Carnegie Mellon, pp. 3, 6.
Rosner, R., et al., "Filtering Techniques to Improve Trace-Cache Efficiency," Sep. 2001, pp. 1-12.

* cited by examiner

Primary Examiner — Michael Alsip
(74) Attorney, Agent, or Firm — Trop, Pruner & Hu, P.C.

(57) ABSTRACT

In one embodiment, a cache memory includes entries each to store a ring level identifier, which may indicate a privilege level of information stored in the entry. This identifier may be used in performing read accesses to the cache memory. As an example, a logic coupled to the cache memory may filter an access to one or more ways of a selected set of the cache memory based at least in part on a current privilege level of a processor and the ring level identifier of the one or more ways. Other embodiments are described and claimed.

22 Claims, 9 Drawing Sheets

CONTROLLING ACCESS TO A CACHE MEMORY USING PRIVILEGE LEVEL INFORMATION

BACKGROUND

Processors are at the heart of modern computing systems. Computers of various types typically include one or more processors, each of which may in turn include multiple processing engines, often referred to as cores. Today, processors such as central processing units (CPUs) include one or more cores and often include additional components within a single socket. Such additional components include integrated controllers and chipset functionality, in addition to integrated storage. Such storage can include various cache memories that are at different levels of a memory subsystem hierarchy.

For example, some systems may include a multi-level cache hierarchy, including at least one low level cache that is closely associated with one or more cores, and higher-level caches, which may be shared caches accessed by multiple cores. Different information can be stored in these different cache memories. In addition, additional memory structures such as hardware buffers such as a translation lookaside buffer (TLB) can be present in a processor. In some processors, different cache memories may be present to store instruction information and data information. In addition, different TLB's may similarly store translations for memory pages including instruction information and memory pages including data information. Of course, some processors include cache memories that store both instruction and data information.

In many processors, user applications and an operating system (OS) do not share code, but they share an instruction cache (I-cache) and an instruction translation lookaside buffer (ITLB). Because an incoming instruction fetch to the I-cache or ITLB searches purely on a memory address basis, power consumption is needlessly increased as a user-mode instruction fetch will never hit a cache line that contains kernel-mode code and vice-versa.

DETAILED DESCRIPTION

In various embodiments, privilege level information may be used to avoid unnecessary probes into certain storages of a processor, e.g., an instruction cache (I-cache)/instruction translation lookaside buffer (ITLB) or other such cache memory. As used herein, the terms "privilege" and "ring" may be used synonymously to refer to a privilege level in which a processor is executing. In a set-associative cache memory of a processor, each cache line may store a ring indicator that corresponds to the ring level associated with the data stored in the cache line. In the context of an I-cache or ITLB, the ring indicator may be the ring level for the instruction stored in the entry or page information stored in the cache line. In general, privilege or ring levels can be enforced using this ring identifier. For example, in one embodiment when the kernel executes, the processor is set to ring 0, the most privileged level. When a user program executes, the processor is set to ring 3, the least privileged level. Rings 1 and 2 can be used by virtualization layers. In some processors, the processor's current privilege level is stored using a 2-bit current privilege level (CPL) field of a code segment register. Other ring hierarchies are possible in other embodiments. While the scope of the present invention is not limited in this regard, the ring level may be used to indicate user or kernel information, although some embodiments may provide for other granularities of ring information.

Using this ring indicator, ways of different arrays of a selected set of a cache memory may only be accessed if the stored ring level indicator matches the CPL, e.g., obtained from a code segment register in the current thread. For ease of reference, this ring level information stored with each cacheline may be referred to as an R-tag. In an embodiment in which only two ring levels, user and kernel are present, the R-tag can be a single bit. Using privilege level information in this way can reduce dynamic power consumption of various cache arrays including an I-cache tag and/or data array, and an ITLB tag and/or data array, due to elimination of unnecessary cross-privilege checks and data fetches. For example, for a user-level instruction fetch, there is no need to search the ways that contain kernel-level code.

In some embodiments, a ring-level check may be located off the critical path of tag array accesses. For OS-intensive workloads, an R-tag can eliminate a great portion of the cache data accesses. In addition, for workloads that are known to be user-instruction dominated, kernel code can still have large occupancy and long residency in the instruction cache. As a result, even for user-dominated applications, using R-tag information in accordance with an embodiment of the present invention can eliminate a significant portion of the accesses to the tag and data arrays of an I-cache and ITLB.

Figure 1A:
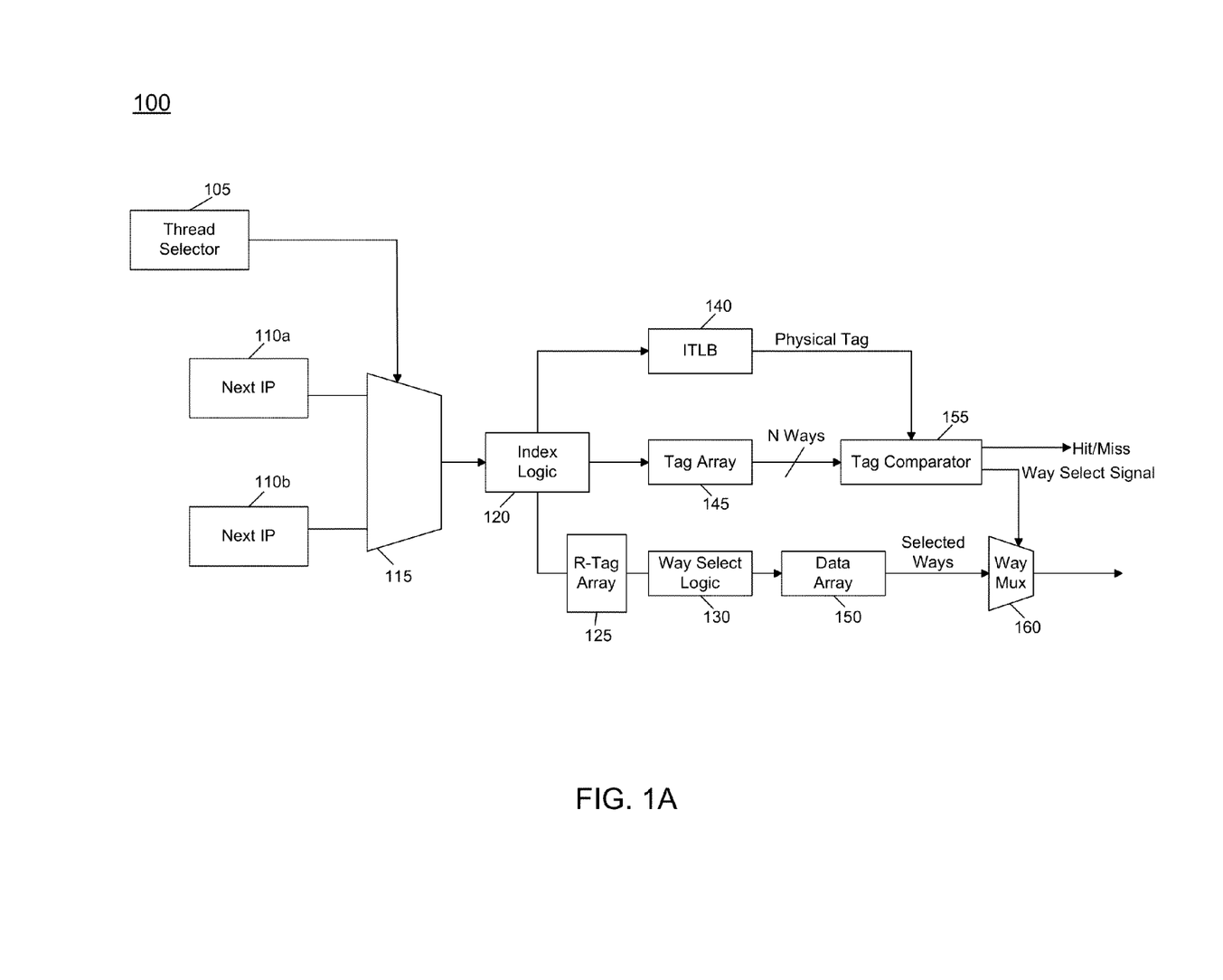
FIG. 1A is a block diagram of a read access pipeline of a cache memory in accordance with one embodiment of the present invention.

Referring now to FIG. 1A, shown is a block diagram of a read access portion of a pipeline of a cache memory subsystem in accordance with one embodiment of the present invention. As seen in FIG. 1A, cache memory 100 may include an instruction cache and an ITLB, although the scope of the present invention is not limited in this regard. In one embodiment, cache memory 100 may be a set-associative cache memory including a plurality of tag arrays and data arrays. Each set of a set-associative cache memory may correspond to a row of the cache memory and may include a plurality of ways (e.g., 4), each corresponding to a cache line. In the illustration of FIG. 1A, cache memory 100 is illustrated as including a read pipeline that can access various structures of the cache memory. In general, the pipeline may proceed from left to right and may incur one or more processor clock cycles to resolve the access and output requested data. Traversal of the pipeline may incur multiple clock cycles, the amount of which can vary in different embodiments.

Assume for purposes of illustration that cache memory 100 is part of a simultaneous multithreaded (SMT) processor including at least two hardware threads (also referred to as logical processors). Each such thread may provide a next instruction pointer (IP) value from a corresponding next IP storage 110$_a$ and 110$_b$. Depending on which thread is currently active in the processor, a thread selector 105 outputs a control signal to a multiplexer 115 which in turn outputs the corresponding instruction address. This instruction address may be an instruction pointer value, a program counter or so forth. This address is provided to an index logic 120 which may be used to select a set of the memory to be accessed. In one embodiment, index logic 120 selects one set of a plurality of cache sets using certain bits of the incoming address information. In general, the output from index logic 120 may be some portions of a virtual address (VA) for the instruction to be accessed. As seen, the VA portions may be provided to an ITLB 140 and a tag array 145. Note it is possible to provide different portions of the VA to the different paths, or all of the VA can be passed and only certain portions used in a given path. In one embodiment, a portion of the VA corresponding to a virtual page number (e.g., most significant bits of the VA) may be provided to ITLB 140 and the output from the ITLB is a physical page number. In one embodiment, the input to tag array 145 can be the lower bits of the VA, e.g., corresponding to page offset bits.

Based on the received VA portion, ITLB 140 may output a physical tag which may correspond, in one embodiment to a page number (e.g., of a physical address (PA)) to which the instruction address corresponds. Note that while shown as a single structure in FIG. 1A, understand that an ITLB may include separate tag and data arrays. In turn, tag array 145 may output a plurality of ways that correspond to the received VA portion. Namely, all N ways of the selected set may be output and provided to a tag comparator 155. Based on the received physical tag from ITLB 140 and the received ways from tag array 145, tag comparator 155 may determine whether one of the received ways matches the physical tag such that a hit occurs. If so, a hit signal is sent from tag comparator 155 and in addition, a way select signal is provided to a way multiplexer 160. Otherwise, if no match occurs, a miss signal is output from tag comparator 155. Such miss signaling may include a memory access request to obtain the missing information from a higher level of a memory hierarchy, e.g., another cache level or main memory.

As discussed above, in one implementation to reduce power consumption, a data array 150 of the cache memory may have a reduced number of ways selected upon a read access that hits a set of the cache memory. To this end, a way select logic 130 may enable only a reduced number of ways of the selected set of data array 150 to be accessed and output to way multiplexer 160. This selection by way select logic 130 may be based on information stored in an R-tag array 125.

R-tag array 125 may store privilege level information for a corresponding cache line stored in data array 150. In one implementation, R-tag array 125 may store the ring level indicator and in addition may also store, for each set, a ring-level vector, which can be a vector including a plurality of entries each including one of the ring indicators and thus can be a vector resulting from a collection of the ring indictors for the set. In such implementations, each ring level tag may be implemented logically as part of a cacheline of the I-cache, such that each cacheline includes a data payload (stored in data array 150), a regular tag (stored in tag array 145) and a ring tag (stored in R-tag array 125). As seen in FIG. 1A, index logic 120 provides information regarding the selected set to R-tag array 125, which accesses the R-tags for the selected set and provides them to way selection logic 130 to enable a determination of which of the corresponding ways match the current privilege level of the processor.

In one embodiment, selection logic 130 generates enable signals that are provided to circuitry that enables given ways of data array 150 to be powered up and accessed. In one embodiment, the output of select logic 130 may be used to control pre-chargers for bitlines and/or wordlines of the ways of the selected set. As an example, when a non-selected way is determined in selection logic 130, no enable signals are sent to the pre-chargers for the corresponding bit lines. In some embodiments, word lines may similarly be disabled in a cache architecture in which segmented word lines are present, with each segment of a word line corresponding to a way. As a result, ways of the selected set that do not match the current privilege level are not accessed, and the power consumption of such accesses can be avoided. While shown with this particular implementation in the embodiment of FIG. 1A, understand the scope of the present invention is not limited in this regard.

In the embodiment of FIG. 1A, in tag array 145 N tags of the selected set are compared against the incoming tag. At most one comparator can generate a hit, thus N–1 tag accesses are a waste of energy. Due to tight timing constraints of the pipeline, data array 150 is accessed in parallel with tag array 145. Assuming all ways are accessed upon a tag match, N–1 of the N ways of data blocks accessed are discarded. Using the embodiment of FIG. 1A, a reduced number of data tags can be accessed in data array 150. Thus after filtering out ways that contain instructions of irrelevant rings, a reduced number of ways are accessed in data array 150. Note that the largest part of the power consumption from a cache memory access is from the data array, as conventionally all ways of a selected set are read out simultaneously. This is so because the data array is large enough such that one cannot wait until the comparison results from tag array 145 are available. Otherwise one or more other pipeline stages would need to be added in order to hide the latency.

Figure 1B:
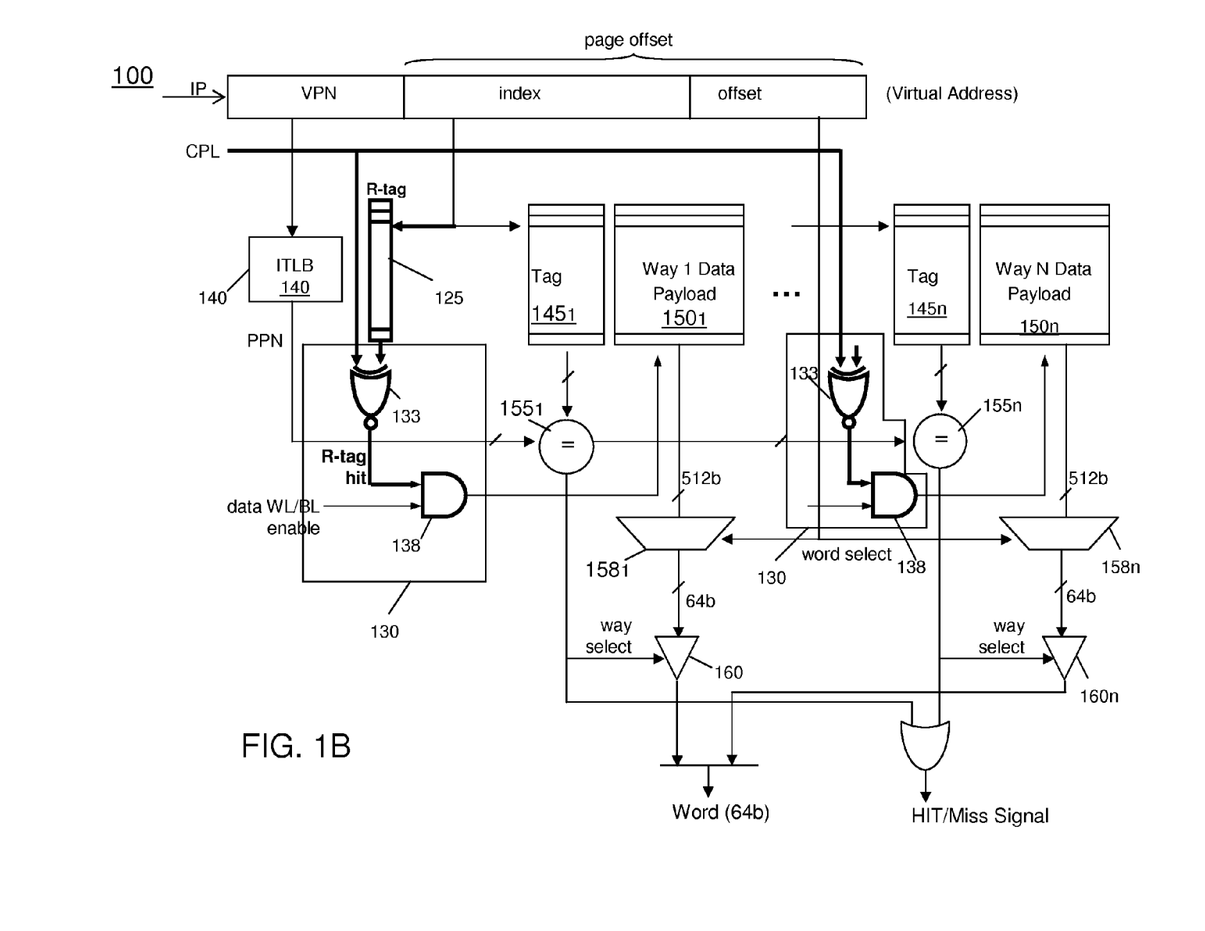
FIG. 1B is a block diagram of a cache memory in accordance with an embodiment of the present invention.

Referring now to FIG. 1B, shown is a block diagram of a cache memory in accordance with an embodiment of the present invention. As seen in FIG. 1B, cache memory 100 may be similarly adapted to that of FIG. 1A. Note however with regard to FIG. 1B, different portions of an incoming address, e.g. an instruction pointer value corresponding to a virtual address, can be provided to ITLB 140, tag array 145 and word selectors 158. Specifically, a most significant portion of the address corresponding to a virtual page number may be provided to ITLB 140. In turn, an index portion of a page offset may be provided both to ring tag array 125 and tag array 145. In turn, a word offset corresponding to the least significant portion of the virtual address may be provided to corresponding word selectors 158. As further seen in the embodiment of FIG. 1B, way select logic 130 may include an exclusive-NOR (XNOR) gate 133 and an AND gate 138 to receive the output of XNOR 133 and a corresponding data enable signal. XNOR 133 may receive a corresponding ring tag and the current privilege level. In the embodiment of FIG. 1B, the ring tag may be a single bit. However, in other implementations a multi-bit ring tag may be provided to multiple XNOR gates as needed. The output of AND gate 138 to may be provided to enable or filter access to a given way of a selected set. In other aspects, the cache memory of FIG. 1B may be arranged similarly to that discussed above regarding FIG. 1A.

Figure 2:
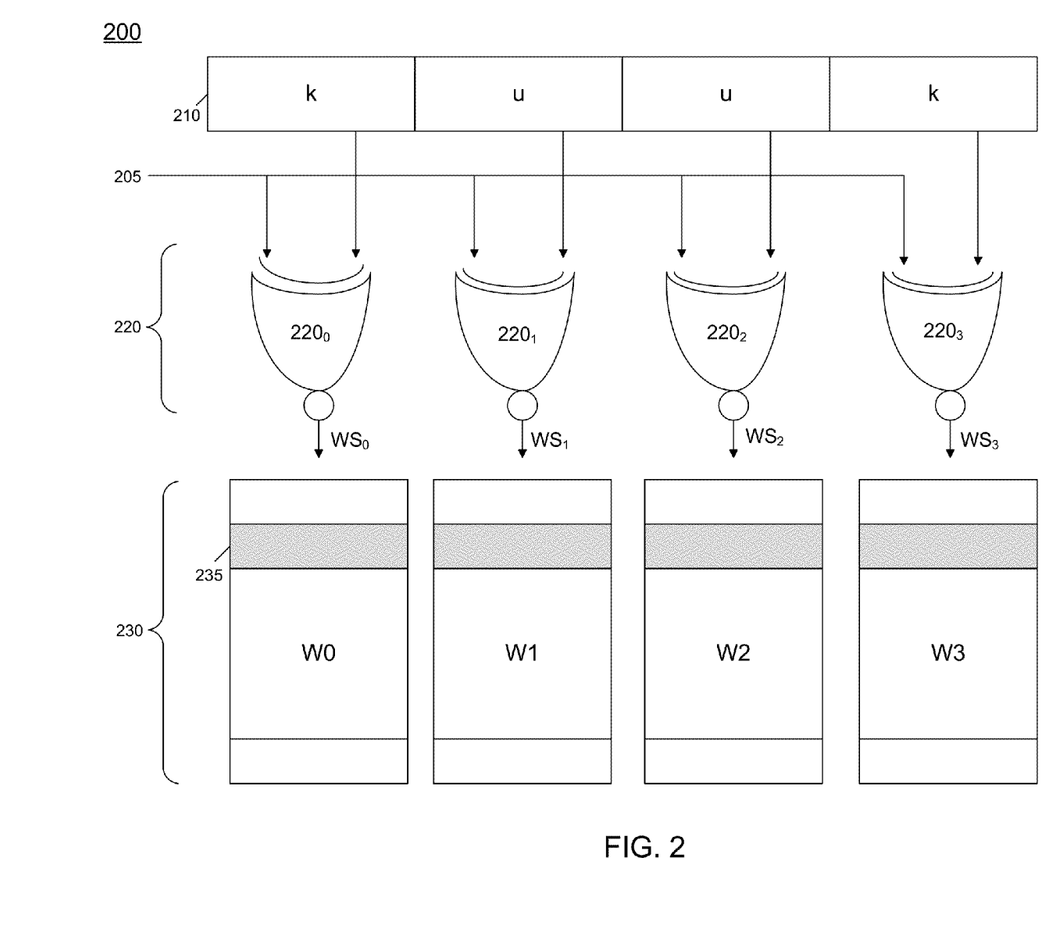
FIG. 2 is a block diagram of way selection logic in accordance with an embodiment of the present invention.

Different manners of implementing way selection logic may be provided. FIG. 2 shows an implementation of way select logic in accordance with one embodiment of the present invention in which ring level vector access and comparison are executed dynamically or on-the-fly for each instruction fetch, assuming that a tight timing budget exists for the pipeline. In the embodiment of FIG. 2 (as with FIG. 1A above), only data array accesses may be optimized, since tag array access timing may be too tight to accommodate a ring-level vector check. Selection logic 200 of FIG. 2 may correspond to way selection logic 130 of FIG. 1A. As seen, way selection logic 200 may be coupled to receive a ring level vector 210. Such vector may include a plurality of entries, each corresponding to a way of a selected set (and which may be provided from R-tag array 125 of FIG. 1A). Note that in some implementations this vector may not be present, and instead ring level indicators associated with cache lines may instead be provided. Each entry of the vector may include a ring level indicator to indicate the ring level of the corresponding information stored in a cache line of the corresponding data array. As seen, each entry may store a privilege level for a corresponding way (e.g., user or kernel in the FIG. 2 embodiment). In addition, way select logic 200 is further coupled to receive a current privilege level of the processor via an input line 205. In one embodiment, this current privilege level may be received from a CPL field of a code segment register.

In the embodiment of FIG. 2, selection logic 200 may include a plurality of exclusive-NOR (XNOR) logics $220_0$-$220_3$, each associated with a given way. As seen, XNOR logics 220 may be used to generate an enable signal for a corresponding way of a selected set 235 of an array 230 via a way select (WS) signal. If the ring level of a corresponding way matches the current privilege level, this way select signal may be at a logic high, enabling access to the corresponding way, otherwise the way select signal is a logic low, disabling the access. Thus in this embodiment the output of a corresponding XNOR gate is active, which enables access to a corresponding way, when the stored privilege level in the current privilege level match. Of course other implementations of way selection logic are possible.

In other embodiments, an optimized implementation may be used to filter way accesses for both tag and data arrays. Here, it is noted that dynamically generating ring level match signals for every instruction fetch is not necessary, because these signals for a cache set do not change unless a cacheline replacement occurs in the set or the ring level of the current thread changes. Based on this observation, a bitmask can be generated for each set, in addition to the ring vector. The bitmask can directly serve as way selection to enable/disable wordlines and bitlines of the arrays. In such implementations, bitmask generation and usage can be decoupled to provide improved timing.

As a result, in addition to conserving power for a data array, an implementation with way selection logic in accordance with another embodiment of the present invention can enable additional way selection power savings for tag arrays of an I-cache and ITLB, even in the presence of tight timing constraints of these pipelines.

Figure 3:
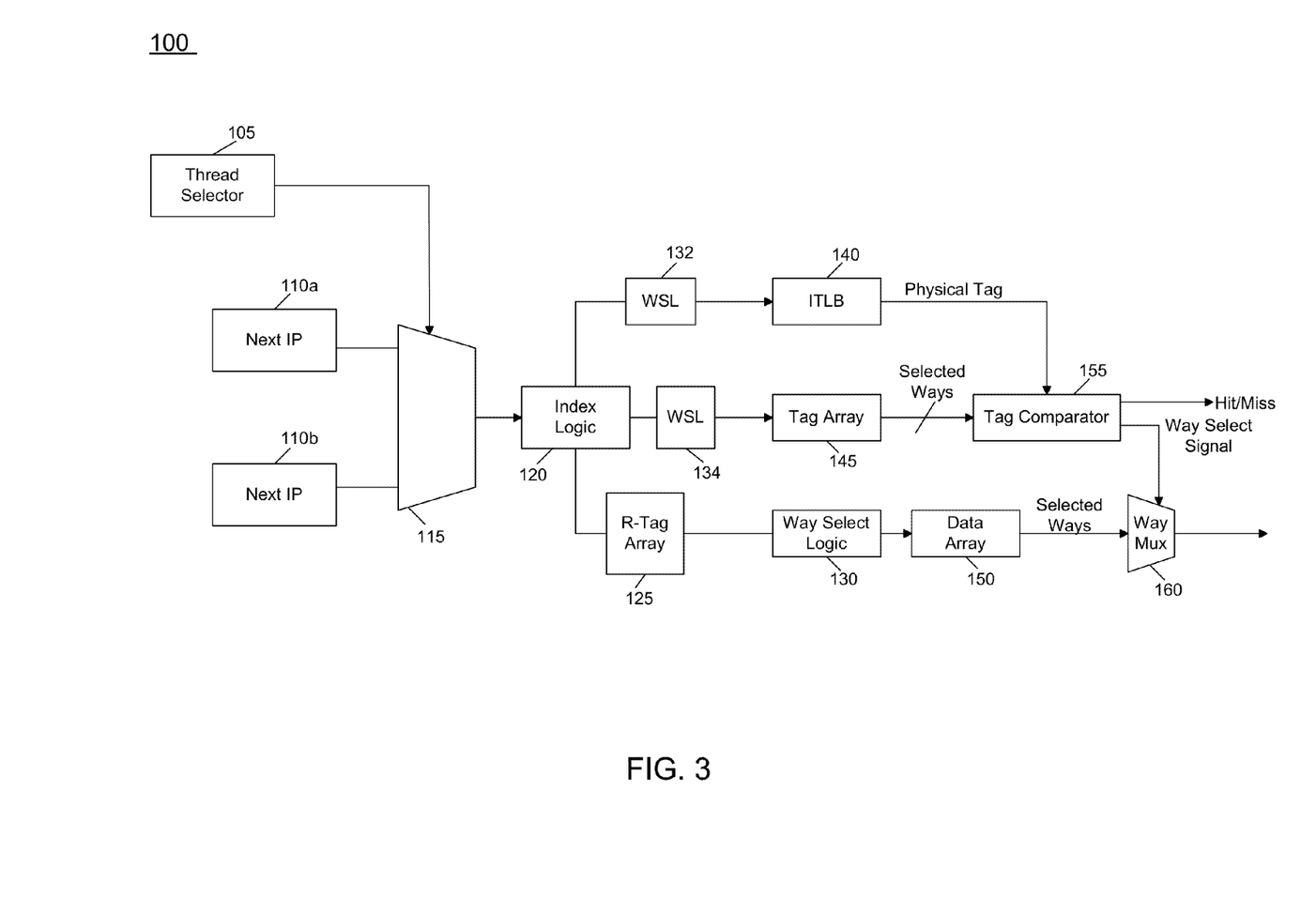
FIG. 3 is a block diagram of a read access pipeline of a cache memory in accordance with another embodiment of the present invention.

Referring now to FIG. 3, shown is a block diagram of a cache memory in accordance with another embodiment of the present invention. As shown in FIG. 3, cache memory 100' may be similarly adapted to that of cache memory 100 of FIG. 1A. However, note that in addition to way select logic 130, additional way select logics 132 and 134 may be present to provide the way selection/filtering for ITLB 140 and tag array 145. Note that in this embodiment, R-tag array 125 may further store, in addition to the R-tag and ring vector, a bit mask that corresponds to a static version of the output of the way selection logic. In these implementations, each cacheline of the I-cache logically includes a data payload (stored in data array 150), regular tag (stored in tag array 145), ring tag and corresponding portion of bit mask (both stored in R-tag array 125). As a result, reduced way accesses to tag array 145 and ITLB 140 may further be realized.

Figure 4:
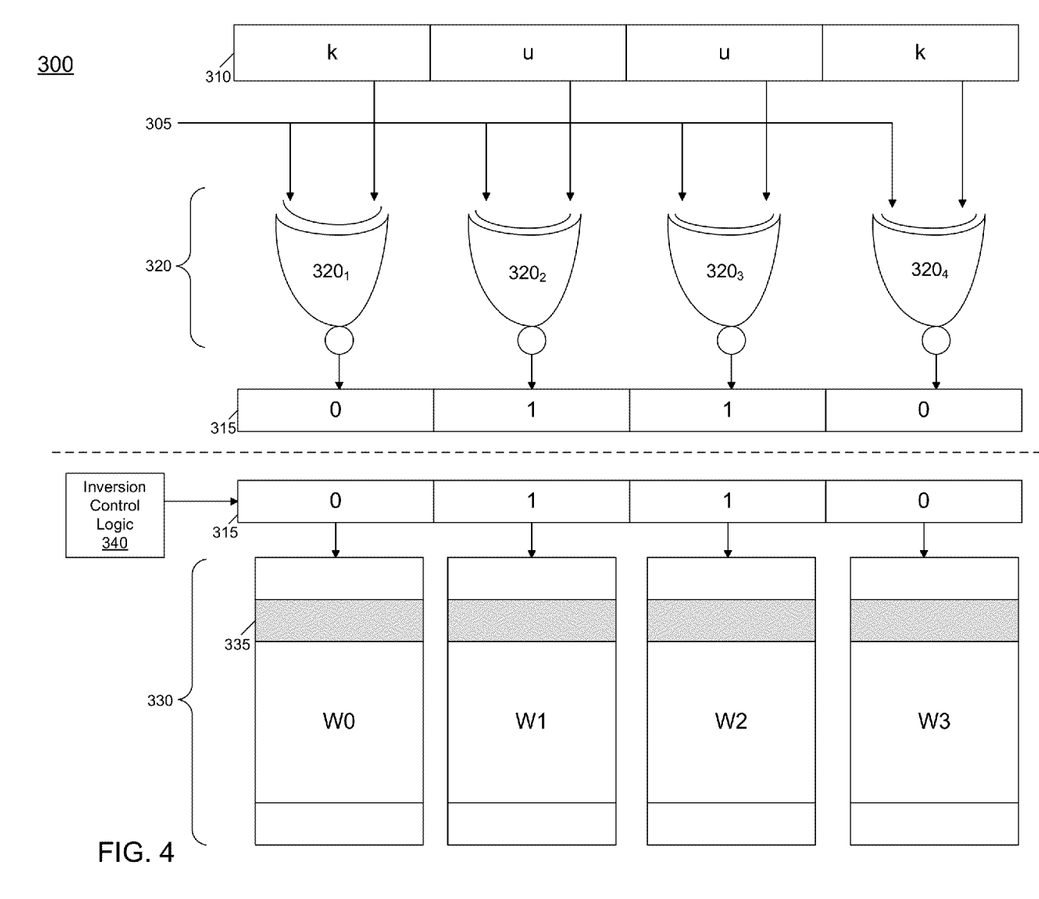
FIG. 4 is a block diagram of way selection logic in accordance with another embodiment of the present invention.

Referring now to FIG. 4, shown is a block diagram of way selection logic in accordance with another embodiment of the present invention. In the embodiment of FIG. 4, way selection logic 300 may be similarly adapted to that of FIG. 2. However, in this embodiment note that output of XNOR gates 320 that receive a ring vector 310 may result in a bit mask 315 for the corresponding set. As described above, this bit mask may be stored, in one embodiment in R-tag array 125. As seen below the dashed line in FIG. 4, once generated the bit mask can be used to perform way selection and filtering directly to ways of a selected set 335 of array 330 during a read access. That is, ring tag comparison is performed when a cacheline is installed, not when it is read. Thus in the implementation of FIG. 4, ring-level check has been taken off the critical path of tag array accesses, optimizing the data and tag accesses.

Thus with reference back to FIG. 3, when a cache set is selected by index logic 120 for a cache read, its bitmask is ready to use, without the need for ring tag comparison, and thus way select logic 130 of FIG. 3 itself may not be used in access/filter operations for a read access. In other words, the bitmask for each cache set is generated before any read is made to the set. Compared with the implementation of FIG. 2, in this decoupled mechanism, generation of the bitmask is no longer on the critical path of tag array reads; it is done in the cache miss handling process, when a new cache line is inserted. As such, using a static-based bit mask implementation, power savings for accessing all arrays of an I-cache and ITLB can be realized. To enable the bitmask to be valid in any privilege level, the bitmask may be updated on a change to the processor's ring level. For example, in one embodiment, every bit in every bitmask can be flipped to thus update the bitmasks. In the embodiment of FIG. 4, an inversion control logic 340 may be part of the way selection logic to perform this flipping of bitmask values on a privilege level change.

Figure 5:
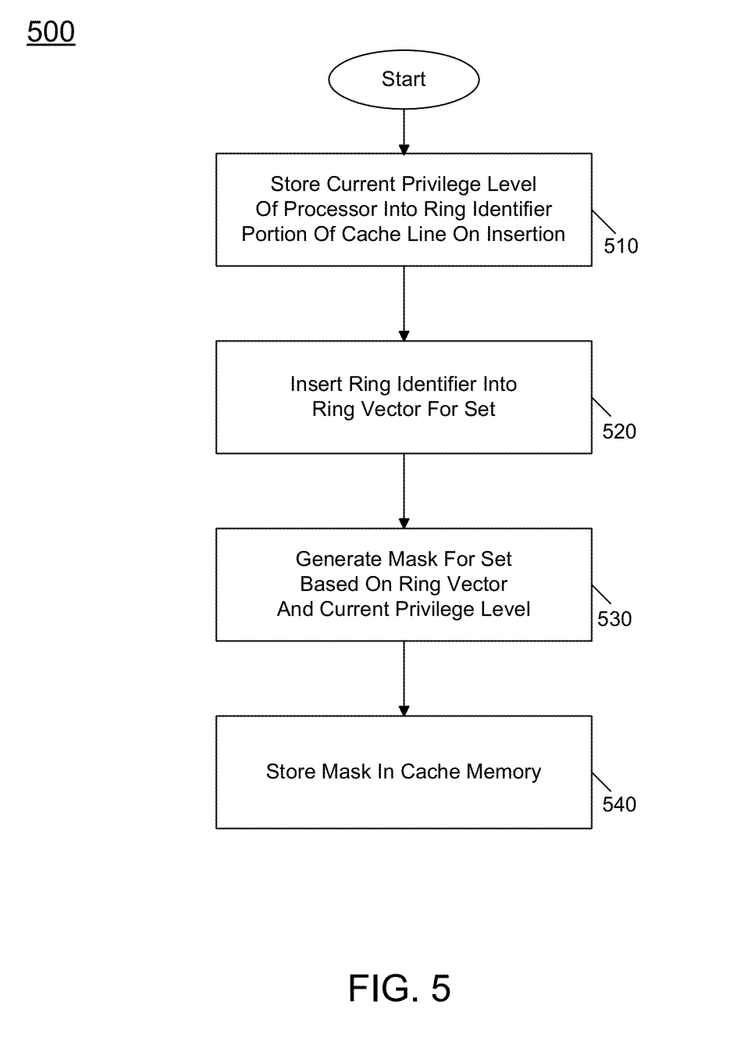
FIG. 5 is a flow diagram of a method for generating ring tag information in accordance with an embodiment of the present invention.

Referring now to FIG. 5, shown is a flow diagram of a method for generating ring tag information in accordance with an embodiment of the present invention. As shown in FIG. 5, method 500 may be implemented by logic such as a cache controller associated with a cache memory system. In the embodiment of FIG. 5, discussion is with reference to an instruction cache, although the scope of the present invention is not limited in this regard. For example, in other implementations a similar method may be performed for an ITLB or other cache memory. As seen in FIG. 5, method 500 may begin by storing a current privilege level of a processor into a ring identifier portion of a cache line on insertion of the cache line (block 510). For example, this ring identifier portion may be stored in a separate ring tag array of the cache memory, although logically the ring tag portion may be considered to be part of a cache line. In addition, the ring identifier may further be inserted into a ring vector for the set of which the cache line is a part (block 520). This set level ring vector may also be stored in the ring tag array or other array of the cache memory. In implementations in which a dynamic comparison is performed, method 500 may conclude at this point.

However in implementations in which a bit mask is generated and used to statically select ways for access and filtering, method 500 may further continue on to generate a mask for the set based on the ring vector and current privilege level (block 530). Such operation may be performed by way selection logic, in one embodiment. Then this mask may be stored in the cache memory (block 540). For example, the mask can be stored in the ring tag array or another portion of the cache memory. After this generation of the bitmask, which may be performed at insertion of a new cache line into the cache memory, the ring tag information can be used to aid in performing read accesses with reduced power consumption.

Figure 6:
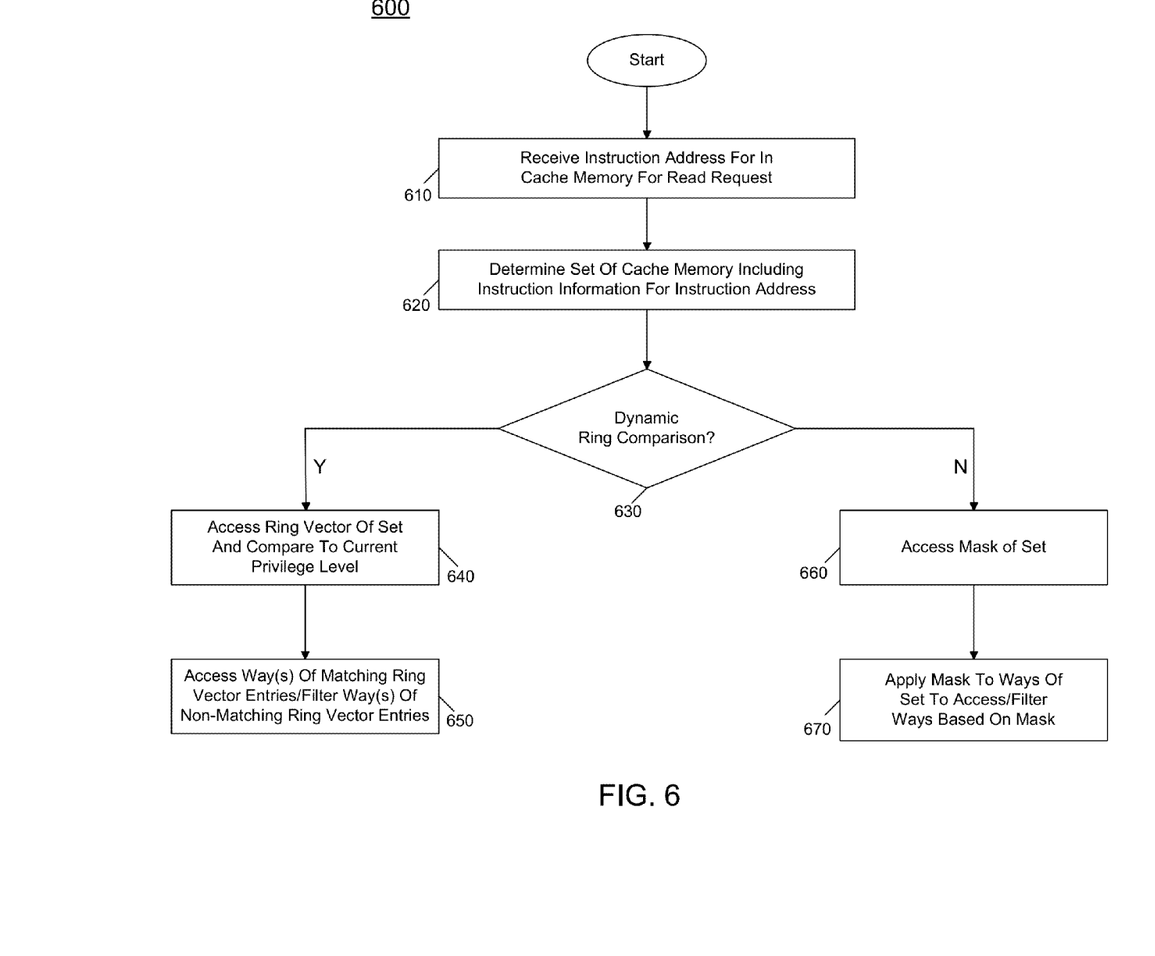
FIG. 6 is a flow diagram of a method for performing a read access to a cache memory in accordance with an embodiment of the present invention.

Referring now to FIG. 6, shown is a flow diagram of a method for performing a read access to a cache memory in accordance with an embodiment of the present invention. Method 600 of FIG. 6 may be implemented in part using way selection logic, in addition to other cache controller circuitry, indexing logic, and so forth. As seen, method 600 may begin by receiving an instruction address for a read request in a cache memory (block 610). In one embodiment, this instruction address may come from next instruction pointer logic associated with a given thread. Then, indexing logic may determine a selected set of the cache memory that includes instruction information for this address (block 620). Next it may be determined whether a dynamic ring comparison is to be performed (block 630). Note that this determination of diamond 630 may not occur in many implementations. That is, a processor may be configured to either perform dynamic ring comparison or to use a static-based method as described above. However for ease of discussion this determination of diamond 630 illustrates different possible implementations.

For dynamic ring comparison operations, control passes to block 640 where a ring vector may be accessed for the selected set and the various entries of the vector may be compared to a current privilege level. Based on this comparison, one or more ways that match the ring vector entries may be selected for access (block 650). For example, these ways may have their corresponding word line and bit lines enabled, while ways that do not match the current privilege level may be filtered and thus not enabled, reducing power consumption. This power reduction can be from not enabling bit lines of the filtered ways, or in some implementations additional savings can result from also not enabling word lines of filtered ways, in a segmented architecture.

If instead an implementation performs a static-based way selection process, control passes to block 660, where a mask for the selected set may be accessed. Then, the mask may be applied to various control structures of the various arrays to directly access the matching ways and filter the non-matching ways such that power can be reduced (block 670).

In a multi-threaded processor, N bitmasks may be provided for each set when there are N hardware contexts. Selecting the correct bitmask of the multiple bitmasks can be performed in thread selector 105 of FIG. 1A, in one embodiment. On an M-context multithreaded core supporting R ring levels, the total storage size for storing ring levels and bitmasks is:

$M \times \log(R) \times (cache\_size/cacheline\_size)$ bits and $M \times \log(R) \times Number\_of\_entries$ bits for the I-cache and I-TLB, respectively.

For example, for a processor with M=2, R=4, and having a 32 kilobyte (KB) cache with 64 bytes (B) per the line, and a 128-entry ITLB, the total storage overhead is 2048 bits (256 B)+512 bits (64 B)=320 bytes. The power consumption overhead of such a structure can be minimal compared with the number of subbank accesses to unneeded ways that are saved. Note that it is possible for an OS to execute user code in kernel mode. This is harmless except for self-modifying code. To avoid this situation, the R-tag functionality can be disabled in such a rare usage case. In general, the way selector filtering realized by embodiments of the present invention can be controlled to be enabled or disabled for certain applications.

Thus using an embodiment of the present invention, cross-checks between user-mode and kernel-mode instructions can be avoided. As an example, a user-mode instruction fetch can be processed to filter accesses to subbanks of cache arrays containing kernel-mode instructions, and vice versa. Filtering in accordance with an embodiment of the present invention can be applied to ITLB tag and data arrays and I-cache tag and data arrays.

Figure 7:
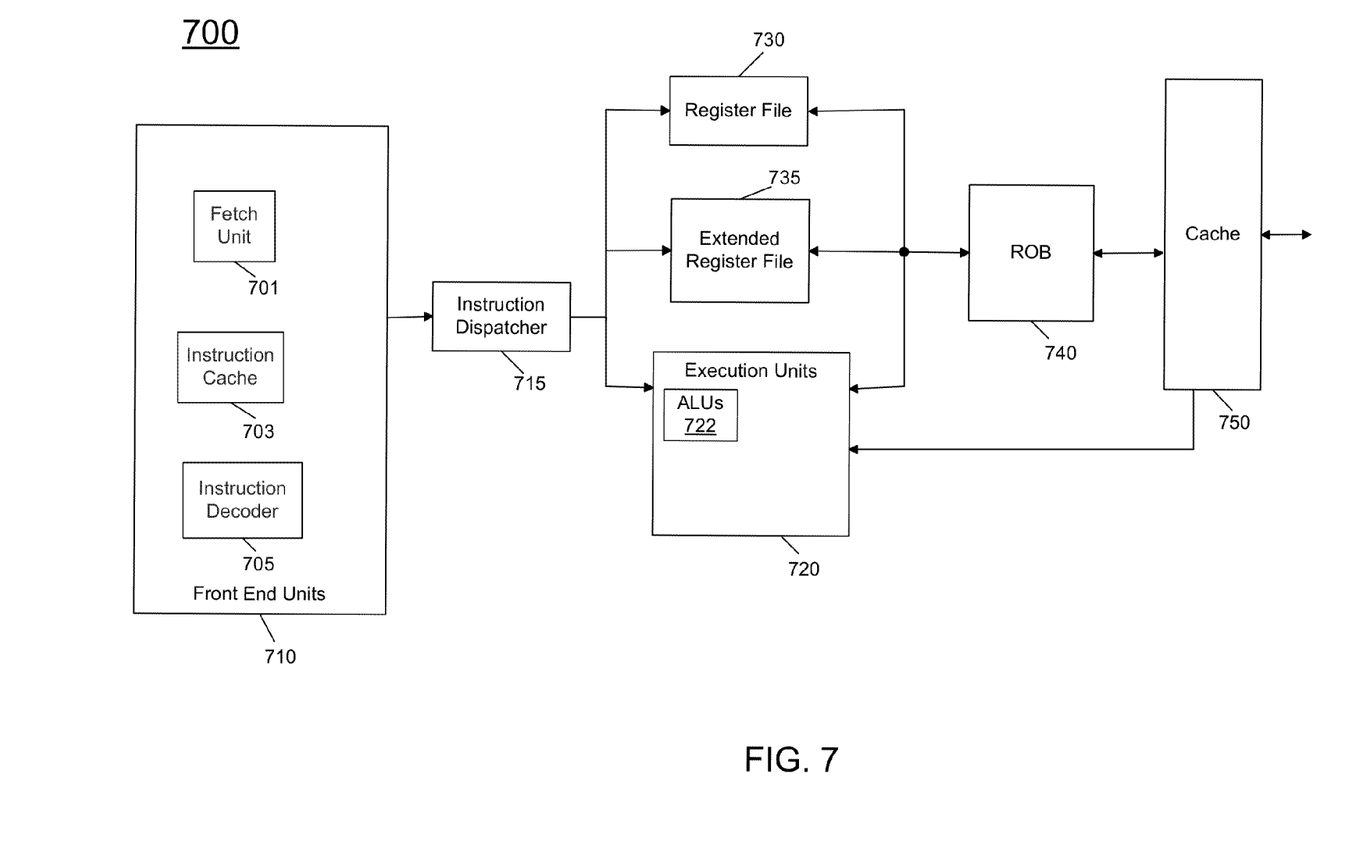
FIG. 7 is a block diagram of a processor core in accordance with one embodiment of the present invention.

Referring now to FIG. 7, shown is a block diagram of a processor core in accordance with one embodiment of the present invention. As shown in FIG. 7, processor core 700 may be a multi-stage pipelined out-of-order processor. Processor core 700 is shown with a relatively simplified view in FIG. 7 to illustrate various features used in connection with power efficient read access to a cache memory in accordance with an embodiment of the present invention.

As shown in FIG. 7, core 700 includes front end units 710, which may be used to fetch instructions to be executed and prepare them for use later in the processor. For example, front end units 710 may include a fetch unit 701, an instruction cache 703, and an instruction decoder 705. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, i.e., micro-operations for execution by the processor. In various embodiments, instruction cache 703 may also include an instruction TLB, and may include the various arrays and logic described above with regard to FIG. 1A or 3. In this way, instruction cache 703 can operate with reduced power consumption when operating in a given privilege level.

Coupled between front end units 710 and execution units 720 is an instruction dispatcher 715 that may be used to receive the micro-instructions and prepare them for execution. More specifically instruction dispatcher 715 may include various buffers to allocate various resources needed for execution, as well as to provide renaming of logical registers onto storage locations within various register files such as register file 730 and extended register file 735. Register file 730 may include separate register files for integer and floating point operations. Extended register file 735 may provide storage for vector-sized units, e.g., 256 or 512 bits per register.

Various resources may be present in execution units 720, including, for example, various integer, floating point, and single instruction multiple data (SIMD) logic units, among other specialized hardware. For example, such execution units may include one or more arithmetic logic units (ALUs) 722. Results may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. Of course, ROB 740 may handle other operations associated with retirement.

As shown in FIG. 7, ROB 740 is coupled to a cache 750 which, in one embodiment may be a low level cache (e.g., an L1 cache) although the scope of the present invention is not limited in this regard. Also, execution units 720 can be directly coupled to cache 750. While shown with this high level in the embodiment of FIG. 7, understand the scope of the present invention is not limited in this regard.

Figure 8:
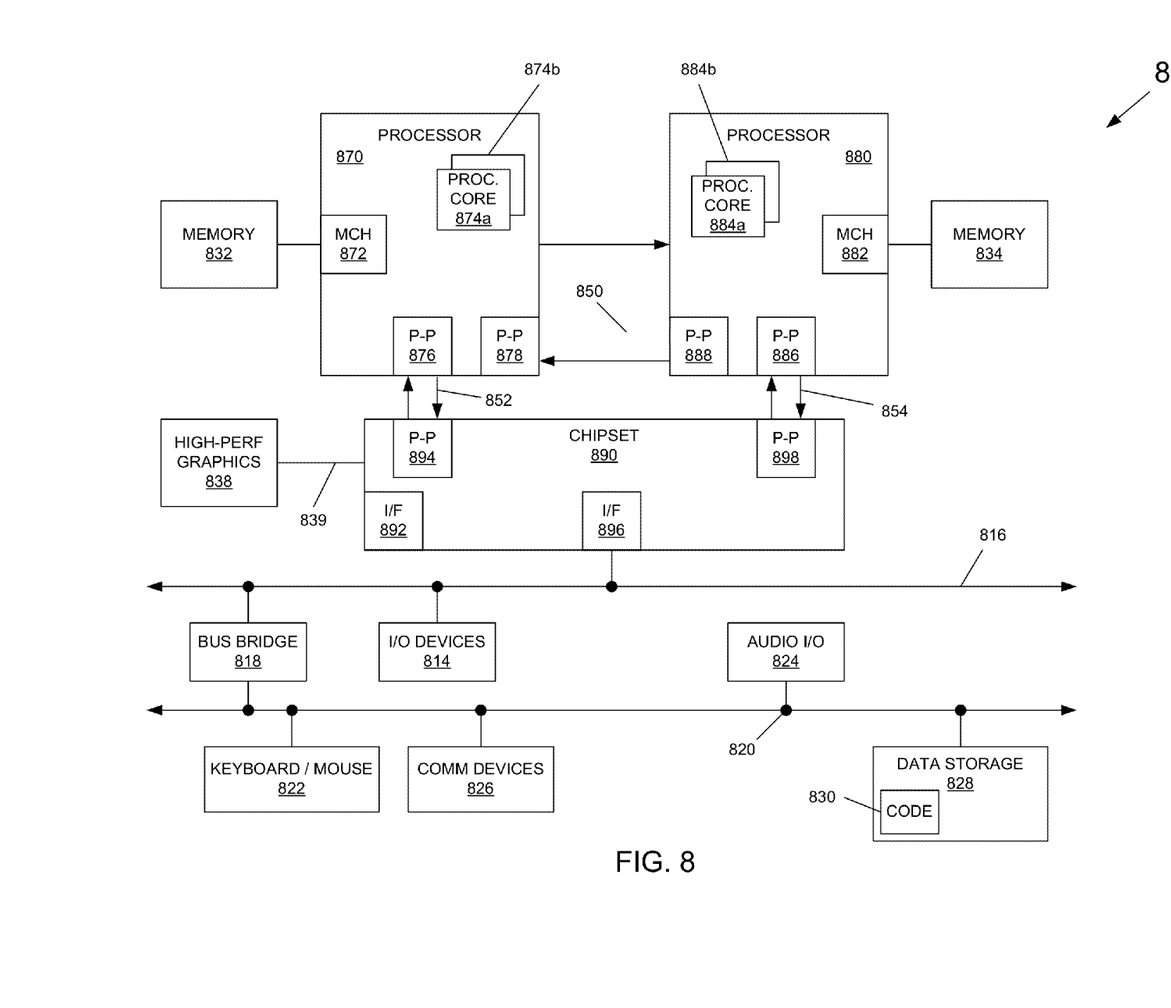
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. As described above, the processor cores may include or be associated with cache memories including an I-cache and ITLB in accordance with an embodiment of the present invention.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of main memory (e.g., a dynamic random access memory (DRAM)) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an instruction translation lookaside buffer (ITLB) to translate virtual addresses to physical addresses; and
   an instruction cache having:
      a data array that includes a plurality of sets each comprising a corresponding plurality of ways, each of the ways to store a corresponding executable instruction and a privilege level indicator of the corresponding executable instruction;
      a first logic, distinct from the ITLB, to select a first set from the plurality of sets based on address information associated with a read request received from a core for a first executable instruction;
      a second logic, distinct from the first logic and from the ITLB, to mask access to each way of the first set that stores a corresponding privilege level indicator that does not match a processor privilege level and to include in a first subset of the first set each way of the first set that stores a corresponding privilege level indicator that matches the processor privilege level, wherein the ways of the first subset are accessible; and
      a third logic, distinct from the first logic, the second logic, and the ITLB, to select a first way of the first subset that stores the first executable instruction associated with the read request and to enable access by the core to the first executable instruction stored in the first way, wherein selection of the first way is based at least in part on physical tag information associated with the read request.

2. The apparatus of claim 1, wherein the instruction cache is to further store a ring vector for the first set, the ring vector including a plurality of privilege level indicators, each privilege level indicator associated with a corresponding way of the first set.

3. The apparatus of claim 2, wherein the second logic is to receive the ring vector and to filter access to any corresponding ways of the first set having a different privilege level indicator than the processor privilege level.

4. The apparatus of claim 2, wherein the second logic is to receive the ring vector and to generate a mask for the ring vector, the mask to indicate that access is enabled to each way whose corresponding privilege level indicator in the ring vector matches the processor privilege level.

5. The apparatus of claim 4, wherein the second logic is to filter the access to one or more of the ways based on the mask.

6. The apparatus of claim 1, wherein responsive to a match of the processor privilege level and the corresponding privilege level indicator stored in a particular way in the first set the second logic is to enable a corresponding bit line associated with the particular way to be powered up, otherwise the corresponding bit line is not to be powered up.

7. A method comprising:
   receiving from a processor by a cache memory comprising one or more cache lines, address information associated with a first executable instruction that is associated with a read request from the processor, wherein each cache line of the cache memory stores a corresponding executable instruction and a corresponding privilege level indicator that indicates a privilege level of the stored executable instruction, and wherein the cache memory comprises a plurality of sets of cache lines;
   selecting a first set from the plurality of sets based on the address information received from the processor;
   masking access to each cache line of the first set that stores a corresponding privilege level indicator that does not match a processor privilege level and including in a first subset of the first set each cache line of the first set that stores a corresponding privilege level indicator that matches the processor privilege level, wherein the cache lines of the first subset are accessible;
   determining, based on physical tag information associated with the address, whether the first subset includes a first cache line that stores the first executable instruction; and
   enabling access to the first executable instruction in the first cache line in response to the read request if the first subset includes the first cache line, and filtering access to the first executable instruction if the first subset does not include the first cache line.

8. The method of claim 7, further comprising storing a ring vector for the first set in a ring tag array of the cache memory, wherein the ring vector includes a plurality of ring vector entries each to store a corresponding privilege level indicator of the corresponding cache line of the first set.

9. The method of claim 8, further comprising dynamically comparing the ring vector of the first set to the processor privilege level and powering up selected bit lines corresponding to only those cache lines of the first set whose corresponding ring vector entry matches the processor privilege level.

10. The method of claim 8, further comprising generating a mask for the first set to indicate that access to each cache line within the first set whose corresponding privilege level indicator does not match the processor privilege level is prevented.

11. The method of claim 10, further comprising using the mask to filter access to each cache line of the first set whose corresponding privilege level indicator does not match the processor privilege level.

12. The method of claim 10, further comprising dynamically inverting each bit of each mask stored in the ring tag array responsive to a change of the processor privilege level.

13. A processor comprising:
a core to execute instructions of a first privilege level and a second privilege level; and
a cache memory coupled to the core and including a plurality of sets each comprising a corresponding plurality of ways, each of the ways to store a corresponding executable instruction and a respective privilege level indicator of the corresponding executable instruction, wherein the cache memory is to:
select a first set from the plurality of sets based on address information associated with a read request received from the core for a first executable instruction;
mask access to each way of the first set that stores a corresponding privilege level indicator that does not match a processor privilege level and include in a first subset of the first set each way of the first set that stores a corresponding privilege level indicator that matches the processor privilege level, wherein the ways of the first subset are accessible;
select a first way of the first subset that stores the first executable instruction associated with the read request, based on physical tag information associated with the read request; and
enable access by the core to the first executable instruction stored in the first way.

14. The processor of claim 13, wherein the cache memory includes a ring tag array to store the corresponding privilege level indicator of each way of the first set.

15. The processor of claim 14, wherein the ring tag array is to further store a mask for the first set, the mask to indicate, for each way of the first set, that access to the corresponding stored executable instruction is enabled in response to a match of the corresponding stored privilege level indicator with the processor privilege level and access is prevented to each way of the first set whose corresponding stored privilege level indicator does not match the processor privilege level.

16. A system comprising:
a processor including:
a core;
a cache memory that includes a plurality of cache lines each to store a corresponding executable instruction and a corresponding privilege level indicator associated with the corresponding executable instruction;
an instruction translation lookaside buffer (ITLB);
a first logic to select a first set of the cache lines from a plurality of sets of the cache lines based on address information associated with a read request received from the core for a first executable instruction;
a second logic, distinct from the first logic and from the ITLB, to mask access to each cache line of the first set that stores a corresponding privilege level indicator that does not match a processor privilege level and to include in a first subset of the first set each cache line of the first set that stores a corresponding privilege level indicator that matches the processor privilege level, wherein the cache lines of the first subset are accessible; and
a third logic, distinct from the first logic, the second logic, and the ITLB, the third logic to select a first cache line of the first subset that stores a first executable instruction associated with the read request and to enable access by the core to the first executable instruction stored in the first cache line, wherein selection of the first cache line is based at least in part on physical tag information associated with the read request; and
a dynamic random access memory (DRAM) coupled to the processor.

17. The system of claim 16, wherein the cache memory includes a first tag array to store a first plurality of privilege level indicators, a second tag array to store tag information, and a data array to store the executable instructions of one or more of the cache lines, wherein the first tag array is to further store a vector and a mask for the first set of cache lines of the cache memory, the vector including a second plurality of privilege level indicators each corresponding to a respective cache line of the first set, and wherein the mask is based on the vector, the mask to indicate that access is enabled to each executable instruction whose corresponding stored privilege level indicator matches the processor privilege level and the mask to indicate that the access to each executable instruction whose corresponding privilege level indicator does not match the processor privilege level is prevented.

18. The system of claim 17, wherein the cache memory is to disable access to a particular cache line based on the mask.

19. The apparatus of claim 1, wherein responsive to a determination that no match exists between the processor privilege level and the corresponding privilege level indicator stored in a particular way, a word line associated with the corresponding executable instruction stored in the particular way is not powered up.

20. The processor of claim 13, wherein the cache memory is to power up a corresponding bit line associated with each way whose stored privilege level indicator matches the processor privilege level and is to refrain from powering up bit lines associated with ways that store corresponding privilege level indicators that do not match the processor privilege level.

21. The system of claim 16, wherein responsive to a determination that no match exists between the processor privilege level and the corresponding privilege indicator stored in a second cache line, a word line associated with the second cache line is not powered up.

22. The system of claim 16, wherein enablement of access to the first cache line includes power-up of a first bit line associated with the first cache line.

* * * * *